March 28, 1961 W. INGOLD 2,977,293
METHOD FOR THE DETERMINATION OF ION CONCENTRATIONS
AND REDOX POTENTIALS, PARTICULARLY
AT ELEVATED TEMPERATURES
Filed March 13, 1957 2 Sheets-Sheet 2
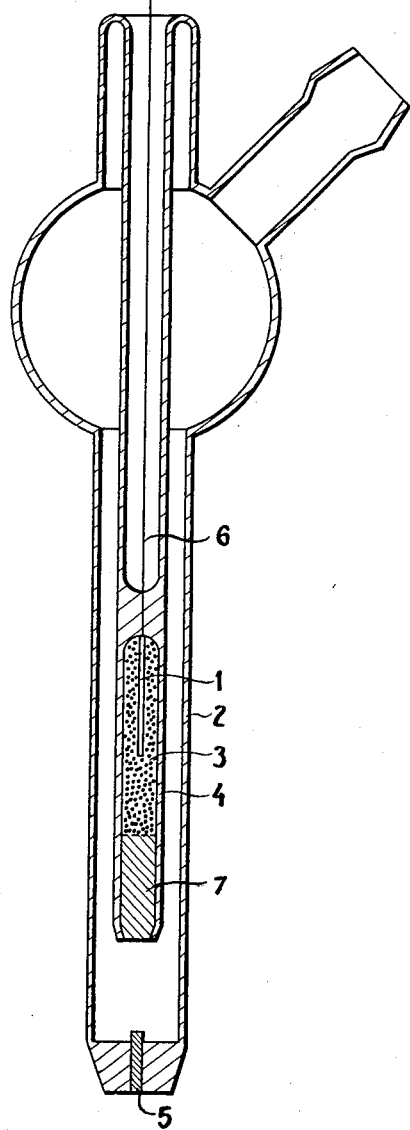
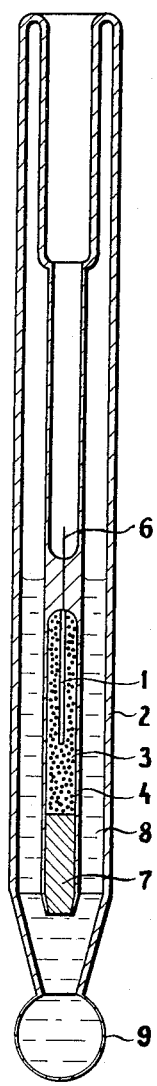
Inventor
Werner Ingold
By
Watson, Cole, Grindle & Watson
Attys.

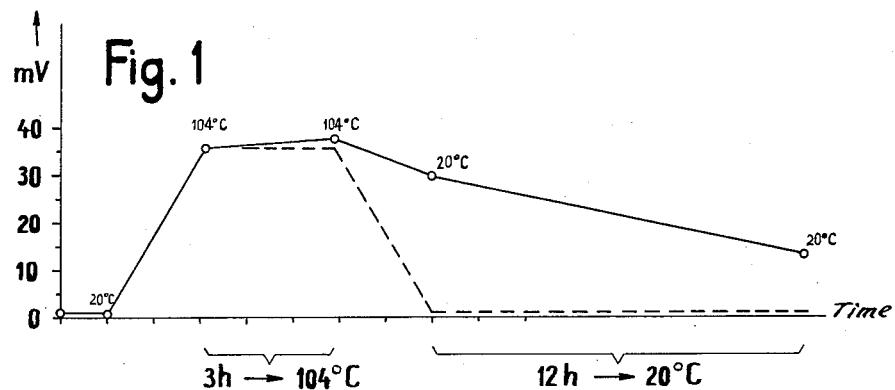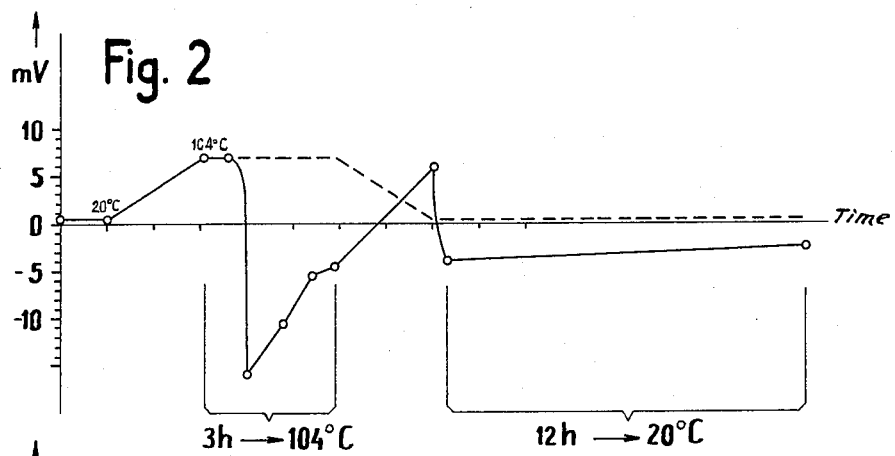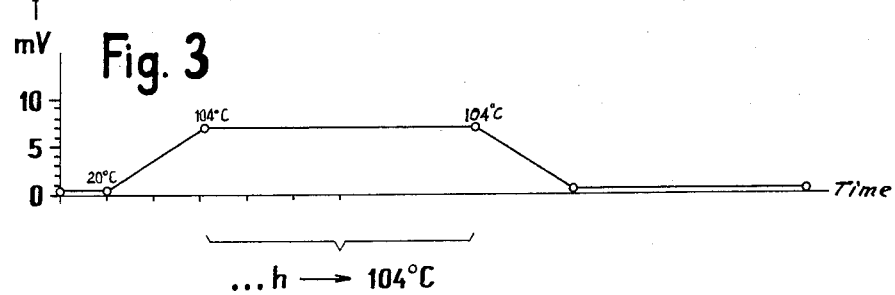

2,977,293
METHOD FOR THE DETERMINATION OF ION CONCENTRATIONS AND REDOX POTENTIALS, PARTICULARLY AT ELEVATED TEMPERATURES

Werner Ingold, Waaggasse 7, Zurich, Switzerland

Filed Mar. 13, 1957, Ser. No. 645,692

Claims priority, application Switzerland Mar. 16, 1956

3 Claims. (Cl. 204—1)

This invention relates to improved measuring assemblies comprising a measuring electrode and a reference electrode in which the latter is arranged in a vessel containing a defined salt solution and connected over a diaphragm to the measuring solution, that supply accurate and dependable measuring values also at elevated working temperatures.

The main purpose of my invention is to provide apparatus for the correct determination of pH values of solutions also in the range from 70 to 130° C. and more.

The opening out of ways and means to carry out accurate reproducible pH measurements at elevated temperatures of the measuring solution is of great technical and economic importance. This may be illustrated thereby that fermentation processes for the production of penicillin, streptomycin and other antibiotics, require the heat sterilization of the nutrient medium prior to its inoculation with the mold and for such purpose prolonged heating of the autoclave to temperatures between 105 and about 130° C. For the control of the mold growth in the broth continuous measurements both of the pH and redox values are very important, but the hitherto available measuring assemblies do not allow the dependable determination of said characteristic values under the temperature conditions present for reasons to be described.

It is well-known that even glass-electrodes with a membrane of substantially hydrolysis resisting glass fail to maintain their potential in a hot solution of constant pH value. On cooling to a defined control temperature, for example 20° C., in a fresh buffer solution said glass-electrodes show a considerable alteration of their potential position prior to the heat treatment. After a wait of some hours or even some days the original potential can be regained, but said delay makes this practically useless.

Apart from the fact that said behavior leads to measurements at temperatures near 100° C. that are erroneous and misleading, the shifting of the calibration position is in particular marked when the autoclave is fitted with a built-in measuring assembly that must be heat-sterilized together with the measuring solution prior to the production process and the continuous control of the pH value, this for the reason that the calibration of the measuring assembly with a buffer solution of known pH value must be effected prior to the sterilization of the mounted measuring assembly.

The hitherto known glass-electrode measuring assemblies alter their calibration position during heat sterilization and have the further disadvantage to regain their original potential after the measuring solution has cooled down to 20° C., for example, very slowly and certainly not in useful time.

The reason for the failure of glass-electrode measuring assemblies at elevated temperatures of the solution to be measured has hitherto been ascribed to the behavior of the glass membrane. No reference could be found in scientific literature thereto that the conventional lead-off systems for glass-electrodes and reference electrodes might be the true source of erroneous pH determinations at elevated temperatures.

However, considering the position it seemed necessary to carefully examine the conventional lead-off systems in view of the possibility that the behavior of the glass membrane at elevated temperatures is not the true cause of faulty pH measurements.

My experiments showed that the erroneous measurements at elevated temperatures are the consequence of alterations in the potential position of the half-cells due to their physico-chemical deficiencies. My findings demonstrate the fact that the glass membrane per se works correctly also in elevated temperature ranges, and explain also the failure of conventional $Hg_2/HgCl_2$ or Ag/AgCl half-cells to supply reproducible measurements at temperatures over about 70–80° C.

I found that $Hg_2Cl_2$ in presence of saturated KCl solution with a temperature above 70° C. has a marked tendency to form complexes and an even stronger tendency towards the molecular rearrangement $Hg_2Cl_2 \rightarrow Hg + HgCl_2$, so that this system cannot be used for elevated working temperatures. In contradistinction thereto the Ag/AgCl half-cell showed a behavior that indicated the possibility of solving the problem by the construction of a special and new type of Ag/AgCl half-cell.

Referring to the annexed drawings:

Figs. 1 and 2 show schematically the behavior of conventional calomel and silver chloride electrodes.

The diagrams were obtained with the following experimental apparatus.

Two half-cells (1) $Hg/Hg_2Cl_2$—saturated KCl solution, conventional type.

(2) Ag/AgCl—saturated KCl solution, conventional type (a silver wire with a galvanic covering of AgCl dipped into the saturated KCl solution)

serving as reference electrodes are differential connected in pairs by means of a KCl bridge. The one experimental electrode (for example 1A) was continuously held at constant temperature (20°C.), the other electrode (for example 1B) was held at an optional temperature between 20° and 104° C. The pair of experimental electrodes dips into two separate, independent thermostatic controlled vessels filled with saturated KCl solution, the two vessels being connected by a bridge of saturated KCl solution.

The curves in full lines show the measured potential differences and those in dotted lines the theoretic development of the curve.

I found that the potential of a Ag/AgCl electrode can be held constant at any temperature in the range from 70 to 130° C. on condition that the electrode dipping into an aqueous solution of KCl is surrounded by a pulverulent mass, consisting of a multitude of solid loose particles of silver chloride, in such manner that the electrolyte is continuously held at the maximum concentration corresponding to the operating temperature whereby a part of the finely dispersed silver chloride present in surplus quantity is brought into solution. Such half-cell has a reproducible potential maintaining a constant value for the specific temperature of the measuring solution.

Fig. 3 shows the behavior of the Ag/AgCl half-cell according to the invention.

Fig. 4 shows a preferred embodiment of this new half-cell for measurements at elevated temperatures.

The Ag/AgCl electrode is arranged in the vessel 2 filled with saturated KCl solution. The silver wire 1 is surrounded by the pulverulent mass 3 consisting of particles of silver chloride with a grain size between 5 and 100 microns. This pulverulent mass is filled into the glass tube 4 closed at the lower end with a pervious stopper 7 and supplied at the upper end with a lead-off 6 sealed gastight in the closed end of the glass tube and in contact to the said mass of silver chloride particles. This glass tube 4 can be readily filled with the electrolyte by dipping its lower end into a saturated solution of KCl and connecting the upper end to a suction device, whereby the air is removed and the porous mass drenched with the solution, rising through the porous diaphragm 5 at the lower end of the vessel 2.

Experiments showed that the mass of silver chloride particles preferably consists of packed discrete grains. As receiver for the pulverulent mass a cartridge can advantageously be used, it can be made of glass, a temperature resisting plastic or a suitable metal such as silver. I found it also practicable to work up the silver chloride particles to a sinter body of adequate porosity, whereby the cartridge becomes superfluous.

The silver chloride particles can be supplied with a thin coating of metallic silver for increasing the active surface of the electrode. This can be effected in simple manner by treating the silver chloride ground in the ball mill with a solution of sodium dithionite, whereby the grains are blackened superficially. Such particles with a coating of metallic silver can also be used for the production of porous sinter bodies. My investigations showed furthermore that the described silver/silver chloride half-cell according to the invention is not limited in its use to reference electrodes. My experiments showed that for the determination of pH values in the range from 70 to 130° C. and more, an assembly in which both the measuring electrode and the reference consist of such Ag/AgCl half-cells with reproducible constant potentials at elevated temperatures is eminently suitable. In such case the glass electrode can be supplied with the described cartridge closed at the lower end with a pervious plug and at the upper end fitted with a sealed lead-off that establishes contact to the preferably blackened mass of silver chloride particles filled into said cartridge.

Fig. 5 shows the use of the half-cell according to the invention as lead-off system for a glass electrode. The Ag/AgCl electrode 1 is arranged in a vessel 2 filled with the buffered electrolyte 8 employed as glass electrode filling. The mass of AgCl particles 3 is contained in the glass cartridge 4, closed at the lower end with a pervious stopper and supplied at the upper end with a lead-off 6 sealed gastight and in contact to the mass of AgCl particles 3.

The said cartridge 4 dips into the glass electrode filling 8, in such a manner that the AgCl particles are drenched with the electrolyte.

The active glass membrane is 9, the pervious plug 7, and the platinum wire lead-off 6.

The Ag/AgCl half-cell according to the invention proved equally suitable as lead-off system for reference electrodes and glass measuring electrodes.

In place of KCl other neutral alkali chloride solutions can be employed as electrolyte, and the AgCl can be replaced by other silver halides.

I subsequently found that the photographic film industry has been provided with a reference electrode supplied with a Ag/AgCl half-cell of similar construction. The Beckman reference electrode meets the special requirements for a reference electrode free of the detrimental effects of mercury and mercurous compounds. Although on the market for some 10 years it remained unknown that this reference electrode would have proved suitable for use at elevated temperatures. Its combination with the Beckman glass electrode 1190° C. supplied an assembly allowing dependable pH measurements in the range −5 to +80° C., and intermittently up to 100° C. This means that previous to the described investigations a reference electrode suitable for use at elevated temperatures was unknown.

The present invention provides measuring assemblies for the determination of pH values and redox potentials in the range from 80 to at least 130° C. comprising the following combinations:

(1) Measuring electrodes
Reference electrode: (2) platinum electrode
(3) Antimony electrode both with Ag/AgCl lead-off system.

Granted that such assemblies, subsequent to the disclosure of the hidden properties of reference electrodes embodying an Ag/AgCl lead-off system, could employ the special non-mercurous Beckman reference electrode mentioned above.

However, the invention claimed is that of an assembly comprising a reference electrode and a glass measuring electrode both supplied with Ag/AgCl lead-off systems, and a glass electrode with a special Ag/AgCl half-cell was not anticipated by Beckman or any other inventor.

The invention represents a valuable advance in the technique of pH and redox potential measurements.

Having described the nature of my invention, its uses and advantages, what I claim is as follows:

1. A method of operating measuring assemblies particularly suitable for the determination of ion activity in the range of 80° to at least 130° C. by means of a reference electrode and a measuring glass electrode, comprising supplying both electrodes with a lead-off system of a silver-silver chloride half-cells into which a silver wire dips into an aqueous solution of a saturated solution of neutral alkali chloride and is at the same time surrounded and in contact with an excess of silver chloride particles so that the electrolyte is maintained at the concentration corresponding to the working temperature by dissolution of the silver chloride present in a state of high dispersion and in surplus quantity, so that the potential of said half-cells remains constant and reproducible also for elevated temperatures in the range from 80° to at least 130° C.

2. A method according to claim 1, in which the silver chloride particles have an average diameter between 5 and 100 microns.

3. A method according to claim 1, in which the silver chloride particles are provided with a thin cover of metallic silver.

References Cited in the file of this patent

UNITED STATES PATENTS

| 2,311,977 | Coleman | Feb. 23, 1943 |
| 2,672,441 | White | Mar. 16, 1954 |
| 2,697,070 | Arthur | Dec. 14, 1954 |
| 2,733,201 | Thompson | Jan. 31, 1956 |

FOREIGN PATENTS

| 939,597 | Germany | Feb. 23, 1956 |

OTHER REFERENCES

Proceedings of the Society for Experimental Biology and Medicine, vol. 23 (1925–26), pp. 147–148. Article by C. V. Taylor.